United States Patent
Kashihara et al.

(10) Patent No.: US 9,095,870 B2
(45) Date of Patent: Aug. 4, 2015

(54) CONDUCTIVE ROLL

(75) Inventors: Shinkichi Kashihara, Konan (JP);
Satoshi Tatsumi, Aichi-ken (JP);
Minobu Iinuma, Ichinomiya (JP);
Yosuke Hayashi, Kasugai (JP); Koji Morihara, Nagoya (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 420 days.

(21) Appl. No.: 13/599,691

(22) Filed: Aug. 30, 2012

(65) Prior Publication Data

US 2013/0053229 A1 Feb. 28, 2013

(30) Foreign Application Priority Data

Aug. 30, 2011 (JP) .................. 2011-187406

(51) Int. Cl.
- *B05C 1/08* (2006.01)
- *G03G 15/02* (2006.01)
- *G03G 15/20* (2006.01)

(52) U.S. Cl.
CPC .......... *B05C 1/0808* (2013.01); *G03G 15/0233* (2013.01); *F16C 2370/38* (2013.01); *G03G 15/2057* (2013.01)

(58) Field of Classification Search
CPC .......... G03G 15/0233; G03G 15/0818; G03G 15/2057; B05C 1/0808; F16C 2370/38
USPC ................. 492/18, 56, 59, 30, 38; 29/895.32, 29/895.3; 399/176, 279, 280, 286
See application file for complete search history.

(56) References Cited

U.S. PATENT DOCUMENTS

| | | | |
|---|---|---|---|
| 4,107,153 A * | 8/1978 | Akiyama et al. | 528/322 |
| 5,100,704 A | 3/1992 | Iwakura et al. | |
| 7,603,067 B2 * | 10/2009 | Mizumoto | 399/286 |
| 8,580,863 B2 * | 11/2013 | Shibaya et al. | 521/86 |
| 2002/0074696 A1 | 6/2002 | Wu et al. | |
| 2003/0119639 A1* | 6/2003 | Manabe et al. | 492/56 |
| 2003/0194504 A1 | 10/2003 | Bilyk et al. | |

(Continued)

FOREIGN PATENT DOCUMENTS

| | | |
|---|---|---|
| JP | 2-251536 A | 10/1990 |
| JP | 2002-539279 A | 11/2002 |

(Continued)

OTHER PUBLICATIONS

International Search Report of PCT/JP2011/068537, date of mailing Oct. 25, 2011.

*Primary Examiner* — Sarang Afzali

(74) *Attorney, Agent, or Firm* — Westerman, Hattori, Daniels & Adrian, LLP

(57) ABSTRACT

The object of the present invention is to provide a conductive roll having high resistance to permanent set and high resistance to adhesion. The conductive roll 1 has a rubber elastic portion formed of a rubber material including a carbon-carbon double bond and exhibiting electric conductivity. The surface of the rubber elastic portion is exposed as the surface of the roll. An organic group including one or more groups selected from silicone groups and fluorine-containing groups is bonded through an isocyanuric acid skeleton to the surface of the rubber elastic portion. The organic group may be a group derived from an organic compound including one or more groups selected from silicone groups and fluorine-containing groups and having a carbon-carbon double bond.

18 Claims, 2 Drawing Sheets

(56) References Cited

U.S. PATENT DOCUMENTS

| | | | |
|---|---|---|---|
| 2007/0100072 A1* | 5/2007 | Akitomo et al. | 525/92 G |
| 2008/0050598 A1 | 2/2008 | Bateman et al. | |
| 2008/0292366 A1* | 11/2008 | Akama et al. | 399/286 |
| 2008/0304874 A1* | 12/2008 | Takagi et al. | 399/286 |
| 2009/0264539 A1* | 10/2009 | Kocur et al. | 514/772.6 |
| 2011/0001190 A1* | 1/2011 | Ide et al. | 257/347 |
| 2011/0194882 A1* | 8/2011 | Kitano et al. | 399/333 |
| 2012/0189948 A1* | 7/2012 | Sonobe et al. | 430/56 |

FOREIGN PATENT DOCUMENTS

| | | |
|---|---|---|
| JP | 2003-512490 A | 4/2003 |
| JP | 2007-121724 A | 5/2007 |
| JP | 2008-528247 A | 7/2008 |
| JP | 2010-156760 A | 7/2010 |
| JP | 2011-095546 A | 5/2011 |
| WO | 00/53638 A1 | 9/2000 |
| WO | 01/29118 A1 | 4/2001 |
| WO | 2006/086828 A1 | 8/2006 |
| WO | 2012/023547 A1 | 2/2012 |

* cited by examiner

CONDUCTIVE ROLL

CROSS-REFERENCES TO RELATED APPLICATIONS

The present application claims priority under 35 U.S.C. §119 to Japanese Application No. 2011-187406, filed Aug. 30, 2011, entitled "CONDUCTIVE ROLL". The contents of this application are incorporated herein by reference in their entirety.

BACKGROUND OF THE INVENTION

1. Field of the Invention

The present invention relates to a conductive roll having a rubber elastic portion.

2. Description of the Related Art

Conductive rolls having a rubber elastic portion have hitherto been used in various fields. A technique in which an object is charged is known as a technique for utilizing this kind of conductive rolls. Specifically, in an electrophotographic image forming apparatus such as a copier or a printer, a surface of a photoreceptor, as an image-support, is charged by a conductive roll.

A structure in which a surface of a rubber elastic portion exhibiting electric conductivity is covered with a resin layer formed of a non-crosslinked resin material having a comparatively low hardness to prevent adherence of toner and not to stress the toner is widely known as the structure of the conductive roll, as shown in Patent JP-A-2011-095546, JP-A-2007-121724, and the like.

SUMMARY OF THE INVENTION

Problems to be Solved by the Invention

The conductive rolls having the conventional structure as described above, however, are disadvantageous in the following point. The conductive roll having the conventional structure has a resin layer formed of a non-crosslinked resin material on a surface of a rubber elastic portion. The non-crosslinked resin material has a lower recovery rate of elasticity than that of a rubber material used in the rubber elastic portion. This causes permanent set in the resin layer, if another member is brought into contact with the surface of the resin layer during a certain period. The permanent set in the resin layer easily causes problems during the use of the conductive roll. For example, when the conductive roll having the conventional structure is used as a charging roll in an electrophotographic image forming apparatus, a photoreceptor is charged unevenly due to the permanent set in the resin layer, which results in striped images easily. As just described, when the resin layer is provided on the surface of the rubber elastic portion, the advantage of the original features of the rubber elastic portion having a high recovery rate of elasticity cannot be sufficiently leveraged, and permanent set resistance of the roll becomes lower as a whole.

In order to improve the permanent set resistance, a structure having no resin layer which deteriorates the permanent set resistance may be considered as one proposal. When such a structure is adopted, however, the surface of the rubber elastic portion having a high tack property is exposed. Consequently, unintentional substances easily adhere to the surface of the rubber elastic portion during the use of the conductive roll, i.e., the resistance to adhesion is decreased. When the conductive roll having no resin layer is used as a charging roll in an electrophotographic image forming apparatus, for example, toner and external additives easily adhere to the surface of the rubber elastic portion. Such adhesion causes defective images to occur easily.

The present invention has been made in view of the background described above, and it intends to provide a conductive roll having high permanent set resistance and high resistance to adhesion.

Means for Solving the Problem

One aspect of the present invention is a conductive roll including a rubber elastic portion which is formed of a rubber material including a rubber component having a carbon-carbon double bond and exhibits electric conductivity, and whose surface is exposed as the surface of the roll, wherein an organic group including one or more groups selected from silicone groups and fluorine-containing groups is bonded through an isocyanuric acid skeleton to the surface of the rubber elastic portion (claim 1).

Effect of the Invention

The conductive roll includes a rubber elastic portion formed of a rubber material having a carbon-carbon double bond and exhibiting electric conductivity, whose surface is exposed as the surface of the roll, i.e., the surface of the rubber elastic portion is not covered with a resin layer which deteriorates the permanent set resistance. This enables the utilization of the original feature, i.e., the high elastic recovery rate, of the rubber elastic portion, and the roll can exhibit the high permanent set resistance as a whole.

In addition, an organic group including one or more groups selected from silicone groups and fluorine-containing groups is bonded through the isocyanuric acid skeleton to the surface of the rubber elastic portion. This decreases the tack property of the surface of the rubber elastic portion due to the action of the silicone group and fluorine-containing group on the rubber elastic portion surface. As a result, unintentional substances such as stains become difficult to adhere to the surface of the rubber elastic portion, i.e., the resistance to adhesion becomes high. In addition, even if the conductive roll is repeatedly used, it is easy to keep one or more functional groups selected from the silicone groups and the fluorine-containing groups on the surface of the rubber elastic portion because of the bond described above. As a result, the resistance to adhesion can be exhibited for a long term, and the durability is excellent.

As stated above, the present invention can provide the conductive roll having the high permanent set resistance and high resistance to adhesion.

DETAILED DESCRIPTION OF THE INVENTION

Figure 1:
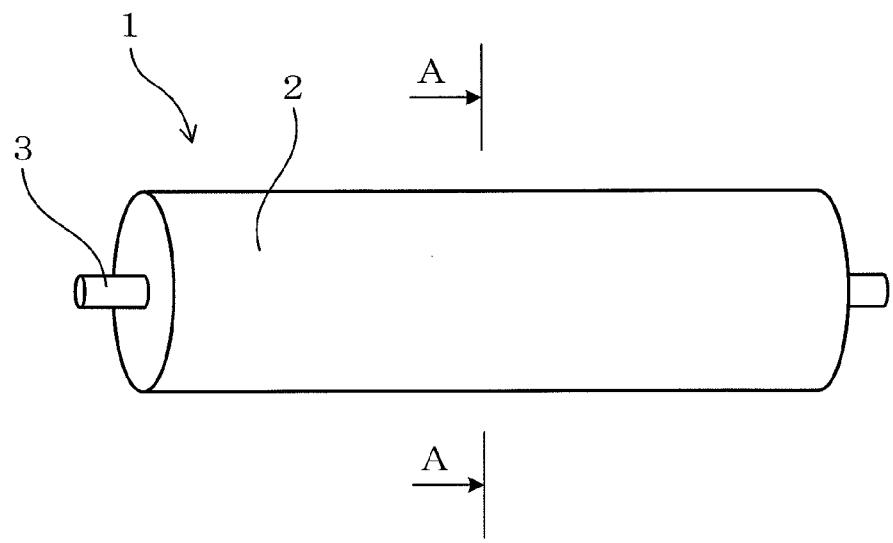
FIG. 1 is an explanatory view schematically showing a conductive roll of Example.

The conductive roll has the rubber elastic portion exhibiting electric conductivity. The rubber elastic portion can be formed, for example, into an almost cylindrical shape along an outer circumference of a conductive shaft. The conductive roll may also be formed so that a part of the short shaft is protruded from each end face of both ends of the rubber elastic portion formed of almost column. Examples of the shaft may include solid-core bodies (cored bars) and hollow bodies formed of metals (including alloys) such as stainless steel, aluminum and iron, solid-core bodies and hollow bodies formed of conductive plastics, solid-core bodies and hollow bodies formed of conductive or non-conductive plastics and metal-plated, and the like.

The surface of the rubber elastic portion is exposed as the surface of the roll, and a resin layer is not formed on the surface of the rubber elastic portion, i.e., the surface of the rubber elastic portion corresponds to the surface of the roll. The formation of the rubber elastic portion is not particularly limited so long as the conductive roll has the formation described above. The rubber elastic portion may be formed by one rubber elastic layer. In addition, the rubber elastic portion may be configured to have one or more rubber elastic layers as other rubber layers under the rubber elastic layer.

The rubber elastic portion is formed of the rubber material including the carbon-carbon double bond (C=C). In order to obtain a bond with a nitrogen atom in the isocyanuric acid skeleton, it is necessary to include the carbon-carbon double bond. The rubber component included in the rubber material may include, for example, rubbers including a carbon-carbon double bond, such as isoprene rubber (IR), butadiene rubber (BR), acrylonitrile-butadiene rubber (NBR), styrene-butadiene rubber (SBR), chloroprene rubber (CR), butyl rubber (IIR), ethylene-propylene-diene rubber (EPDM), natural rubber (NR), and the like. They may be included alone or as a mixture of two or more kinds thereof. The isoprene rubber (IR) and butadiene rubber (BR) can be preferably used as the rubber including the carbon-carbon double bond, in terms of the permanent set resistance, multiplicity of uses, cost reduction, and the like. In addition, a polymer of a rubber including no carbon-carbon double bond and a monomer or oligomer component including a carbon-carbon double bond may be utilized as the rubber component included in the rubber material. The rubber including no carbon-carbon double bond may include, for example, acrylic rubber (ACM), fluororubber (FKM), hydrin rubber (CO, ECO), silicone rubber (O), urethane rubber (U), and the like. The component including the carbon-carbon double bond may include, for example, butadienediol, and the like.

The rubber material forming the rubber elastic portion may include one or more electron-conducting agents such as carbon black, ionic conducting agents such as quaternary ammonium salts, and conducing agents such as ionic liquid, as occasion demands. In addition to the above, the rubber material may include one or more additives such as an inorganic filler, a processing aid, a curing agent, a vulcanization accelerator, a cross-linking agent, a cross-linking aid, an antioxidant, a plasticizer, an ultraviolet absorber, a pigment, an oil, an aid, a surfactant, an extender, and a reinforcing material.

The rubber elastic portion may have a thickness within a range of 1 to 10 mm. When the conductive roll is used in a state in which it is integrated into an image forming apparatus, the thickness of the rubber elastic portion can be made within a range of 1 to 5 mm, in terms of space-saving, and the like.

Here, the organic group including one or more groups selected from the silicone groups and the fluorine-containing groups is bonded through the isocyanuric acid skeleton to the surface of the rubber elastic portion in the conductive roll. The isocyanuric acid skeleton is bonded through an N-atom to the surface of the rubber elastic portion. Specifically, the isocyanuric acid skeleton has three N-atoms. One N-atom of the three N-atoms may be bonded to a C-atom, which forms a carbon-carbon single bond formed by transformation of the carbon-carbon double bond included in the rubber elastic portion, or two N-atoms may be bonded to C-atoms, which forms a carbon-carbon single bond formed by transformation of the carbon-carbon double bond included in the rubber elastic portion.

A Cl-atom can be bonded to a C-atom which is not bonded to the N-atom of C-atoms forming the carbon-carbon single bond. When the isocyanuric acid skeleton is bonded to the surface of the rubber elastic portion and the Cl-atom exists on the surface of the rubber elastic portion, it can be said that the isocyanuric acid skeleton is derived from a chlorinated isocyanuric acid (trichloroisocyanuric acid or derivatives thereof).

When the isocyanuric acid skeleton is bonded through one N-atom to the surface of the rubber elastic portion, the organic group including one or more groups selected from the silicone groups and the fluorine-containing groups may have a formation in which it is bonded to at least one of the remaining two N-atoms. When the isocyanuric acid skeleton is bonded through two N-atoms to the surface of the rubber elastic portion, the organic group including one or more groups selected from the silicone groups and fluorine-containing groups may have a formation in which it is bonded to one remaining N-atom. When two organic groups are bonded to one isocyanuric acid skeleton, the two organic groups may be the same or different.

The organic group may include the silicone group or the fluorine-containing group, or the silicone group and fluorine-containing group. One or more silicone groups and fluorine-containing groups may be included in the organic group. The silicone group may include, for example, a dimethyl silicone group, a diethyl silicone group, a diphenyl silicone group, and the like. The fluorine-containing group may include, for example, perfluoroalkyl groups (preferably having 1 to 200 carbon atoms), perfluoroalkyl alkylene oxide groups such as a perfluoroalkyl ethylene oxide group, perfluoroalkenyl groups, a fluorine atom (—F), and the like.

The organic group, specifically, may be a group derived from an organic compound including one or more groups selected from silicone groups and fluorine-containing groups and having a carbon-carbon double bond (claim 2). The group derived from the organic compound described above is a group in which one C-atom in the carbon-carbon single bond formed by the transformation of the carbon-carbon double bond included in the organic compound is bonded to the N-atom in the isocyanuric acid skeleton.

This case includes chemical structures in which the group derived from the organic compound described above is bonded to at least one N-atom which is not involved in the bond with the surface of the rubber elastic portion among the three N-atoms included in the isocyanuric acid skeleton. For this structure, the resistance to adhesion can be exhibited by the action of the one or more functional groups selected from the silicone groups and the fluorine-containing groups included in the group derived from the organic compound described above.

The organic compound mentioned in the terms "group derived from the organic compound," can be preferably exemplified by a compound represented by Formula 1:

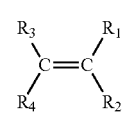

[Formula 1]

In Formula 1, $R_1$ is —$X_2$—$X_1$ or —$X_1$; $X_1$ is a silicone group or a fluorine-containing group; $X_2$ is a group selected from an ester group (—CO—O—), an ether group (—O—), an allyl group (—CO—), a urethane group (—NH—CO—

O—) and an amido group (—NH—CO—), preferably the ester group; and $R_2$ to $R_4$ are each a group selected from a hydrogen atom an alkyl group and $R_1$, preferably the hydrogen atom or the alkyl group, more preferably the hydrogen atom. Of the organic compounds represented by Formula 1, organic compounds represented by Formula 2 wherein n is an integer of preferably 1 to 200, and organic compounds represented by Formula 3 are particularly preferable in terms of stability, reactivity, resistance to adhesion, and the like.

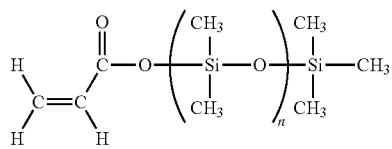

[Formula 2]

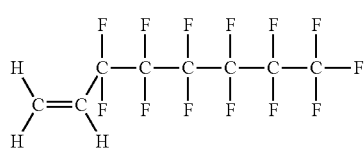

[Formula 3]

The organic compound, in the term "group derived from the organic compound," other than the compounds described above may preferably include organic compounds represented by Formula 4 to Formula 6.

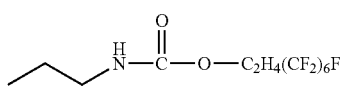

[Formula 4]

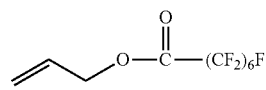

[Formula 5]

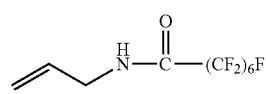

[Formula 6]

The organic compound, in the term "group derived from the organic compound," may further include compounds represented by Formula 7 to Formula 9.

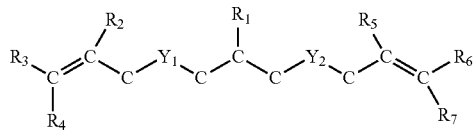

[Formula 7]

In Formula 7, $R_1$ is —$X_2$—$X_1$ or —$X_1$; $X_1$ is a silicone group or a fluorine-containing group; $X_2$ is a group selected from an ester group (—CO—O—), an ether group (—O—), an allyl group (—CO—), a urethane group (—NH—CO—O—) and an amido group (—NH—CO—); $R_2$ to $R_7$ are each a group selected from a hydrogen atom, an alkyl group and $R_1$, preferably the hydrogen atom or the alkyl group, more preferably the hydrogen atom; and $Y_1$ and $Y_2$ are each a silicone group or a fluorine-containing group.

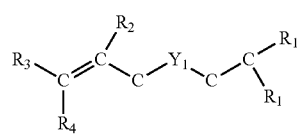

[Formula 8]

In Formula 8, $R_1$ is —$X_2$—$X_1$ or —$X_1$; $X_1$ is a silicone group or a fluorine-containing group; $X_2$ is a group selected from an ester group (—CO—O—), an ether group (—O—), an allyl group (—CO—), a urethane group (—NH—CO—O—) and an amido group (—NH—CO—); and $R_2$ to $R_4$ are each a group selected from a hydrogen atom, an alkyl group and $R_1$, preferably the hydrogen atom or the alkyl group, more preferably the hydrogen atom; and $Y_1$ is each a silicone group or a fluorine-containing group.

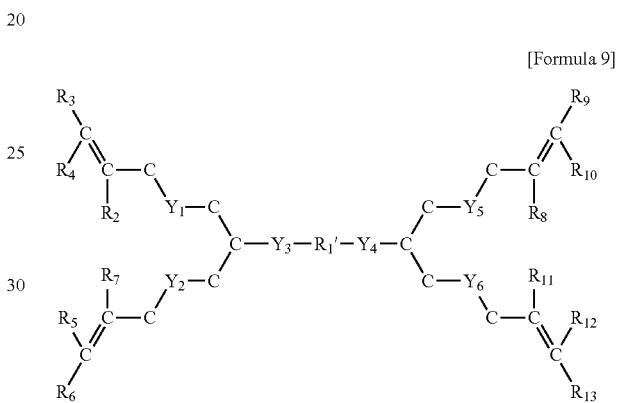

[Formula 9]

In Formula 9, is $R_1'$—$X_2$—$X_1$—$X_2$— or —$X_1$—; $X_1$ is a silicone group or a fluorine-containing group; $X_2$ is a group selected from an ester group (—CO—O—), an ether group (—O—), an allyl group (—CO—), a urethane group (—NH—CO—O—) and an amido group (—NH—CO—); $R_2$ to $R_{13}$ are each a group selected from a hydrogen atom, an alkyl group and $R_1$; $R_1$ is —$X_2$—$X_1$ or —$X_1$; $X_1$ is a silicone group or a fluorine-containing group; $X_2$ is a group selected from an ester group (—CO—O—), an ether group (—O—), an allyl group (—CO—), a urethane group (—NH—CO—O—) and an amido group (—NH—CO—); $R_2$ to $R_{13}$ are each preferably the hydrogen atom or the alkyl group, more preferably the hydrogen atom; and $Y_1$ to $Y_6$ are each a silicone group or a fluorine-containing group.

Of these organic compounds represented by Formula 7 to Formula 9, organic compounds represented by Formula 10 to Formula 13 are preferable in terms of stability, reactivity, resistance to adhesion, and the like. In Formula 12, $R_1''$ is a silicone group, and in Formula 13, $Y_1'$ is a silicone group.

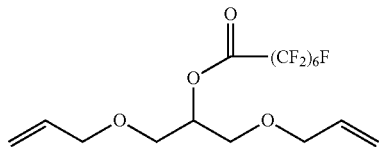

[Formula 10]

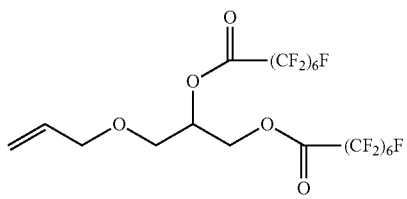

[Formula 11]

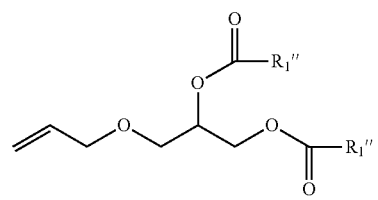

[Formula 12]

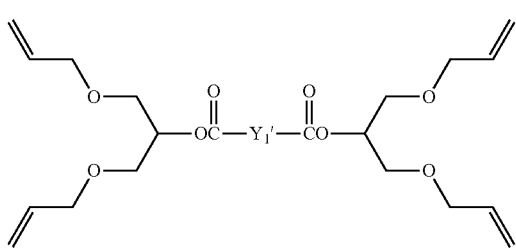

[Formula 13]

The surface structure of the rubber elastic portion in the conductive roll can be detected by using an XPS, NMR, or the like.

The surface roughness Rz of the rubber elastic portion in the conductive roll can be made within a range of 7 to 28 μm (claim 3).

In that case, the surface area of the rubber elastic portion is increased resulting from the surface irregularities as expressed by the surface roughness mentioned above. This can easily secure minute spaces on a contact surface, when the surface of the rubber elastic portion is made contact with an object such as a photoreceptor in order to charge charging of the object. A discharge region is, accordingly, expanded during the contact, and the object is more easily charged. The rubber elastic portion has the lower limit of the surface roughness Rz of preferably 8 μm, more preferably 9 μm, furthermore preferably 10 μm. The rubber elastic portion has the upper limit of the surface roughness Rz of preferably 27 μm, more preferably 26 μm, furthermore preferably 25 μm.

The surface roughness Rz is a ten point height of irregularities, which is measured in accordance with JIS B 0601: 1994. The surface roughness Rz is also an average value of values measured at a total of nine points: three points evenly spaced in a circumferential direction of the conductive roll per each of three points of a center part and both ends in an axial direction of the conductive roll.

The rubber elastic portion in the conductive roll includes inorganic filler, which makes the surface of the rubber elastic portion rough (claim 4).

In that case, it is more unlikely difficult to cause compressive deformation of the surface irregularities caused by the inorganic filler compared to the surface irregularities caused by the rubber component. It is difficult, accordingly, to deform the surface irregularities caused by the inorganic filler by contact load when the surface is in contact with the object; as a result, it becomes easier to maintain the discharge region during the contact, and the object can be further easily charged. The inorganic filler may include, for example, silica, calcium carbonate, talk, and the like. They may be included alone or as a mixture of two or more kinds thereof. The inorganic filler may be subjected to surface treatment with a fatty acid, fatty acid ester, acrylic resin, epoxy resin, polystyrene resin, or the like.

The conductive roll may be used as a charging roll for an image forming apparatus, for example, a copier, a printer, a facsimile machine, a multifunction machine, a POD (Print On Demand) machine, and the like (claim 5).

In that case, good images having no defects such as stripes can be easily obtained even if the rubber elastic portion is in contact with the photoreceptor for a long term, because the rubber elastic portion has the high permanent set resistance. In addition, because of the low tack property of the surface of the rubber elastic portion, toner and external additives are less likely to adhere to the surface of the rubber elastic portion, and the stains on the surface of the rubber elastic portion can be easily inhibited. Hence, good images without defects such as stripes caused by the stains on the surface of the rubber elastic portion become easily obtainable.

The conductive roll may also be used, for example, as a developing roll for an electrophotographic image forming apparatus in a copier, a printer, a facsimile machine, a multi-function machine, a POD (Print On Demand) machine, and the like.

In that case, even if the rubber elastic portion is in contact with a toner layer-forming blade for a long term, good images without defects such as stripes become easily obtainable, because of the high permanent set resistance of the rubber elastic portion. In addition, because of the low tack property of the surface of the rubber elastic portion, toner and external additives are likely to adhere to the surface of the rubber elastic portion, and the stains on the surface of the rubber elastic portion can be easily inhibited. Hence, good images without defects such as stripes caused by the stains on the surface of the rubber elastic portion become easily obtainable.

Furthermore, the conductive roll is also useful, for example, as a cleaning roll for removing fine dust adhering to electronic devices or materials by utilizing an electrification characteristic. This is because a situation in which fine dust keeps adhering to the surface of the roll by tack force hardly occurs.

The conductive roll may be produced, for example, by the following method. First, a rubber composition for forming a rubber elastic portion is prepared. Then, the rubber composition is extruded onto an outer surface of a shaft. The extrusion molding has an advantage in which surface unevenness is easily provided to the surface of the rubber elastic portion. In particular, when a rubber composition prepared with the addition of inorganic filler is used, the surface irregularities are more easily provided to the surface of the rubber elastic portion due to the addition effect of the inorganic filler in combination with the extrusion molding. The extrusion molding method may specifically include, for example, a method in which the rubber composition is supplied to a space between a die and a cored bar to be extruded while the shaft is made to pass through a circular opening of the die, and the like. In such a case, a passing speed of the shaft or an amount of the rubber composition supplied is altered to change the roll shape of the rubber elastic portion to a crown shape.

Next, at least (A) the chlorinated isocyanuric acid such as trichloroisocyanuric acid, (B) at least one organic compound selected from Formula. 1 to Formula. 13, and (C), and a solvent capable of dissolving or dispersing the components (A) and (B) are mixed to prepare surface-treating liquid. A ratio, an amount of the component (A) added [mol]/an amount of the component (B) added [mol] in the surface treating liquid is within a range of ½ to 1/0.01.

The component (C) may specifically include, for example, ether solvents (THF, diethyl ether, dioxane, and the like), ester solvents (ethyl acetate, butyl acetate, and the like), ketone solvents (acetone, MEK, and the like), amide solvents (DMF, DAC, NMP, and the like), tertiary alcohols (tert-butyl alcohol, and the like), water, and the like. The component (C) may be a mixed solvent of a solvent capable of dissolving or dispersing the component (A) and a solvent capable of dissolving or dispersing the component (B). In order to improve the reactivity or inhibit the uneven surface-treatment, the surface treating liquid may be used in an amount within a range of preferably 1 to 10 parts by mass, based on 100 parts by mass of the solvent, more preferably 2 to 5 parts by mass.

Next, the surface-treating liquid is brought into contact with the surface of the rubber elastic portion. The method for bringing the surface treating liquid into contact with the rubber elastic portion is not particularly limited, and a dipping method, a roll coating method, a spray coating method, and the like may be used.

The treatment temperature can be within a range of preferably 20 to 100° C., more preferably 25 to 70° C. in the surface-treatment, in terms of the improvement of the reactivity and the inhibition of the uneven surface treatment. The contact time can be within a range of preferably 10 seconds to one hour, more preferably 30 seconds to 5 minutes in the surface-treatment, in the terms of obtention of the sufficient surface-treatment effects and the productivity.

Next, the rubber elastic portion which has been subjected to surface treated is washed and dried if necessary. When it is washed, the washing time can be preferably within a range of 10 seconds to 10 minutes, in terms of obtention of the good washing effects by sufficiently washing the unreacted surface-treating liquid away, and the productivity.

As stated above, the conductive roll including the rubber elastic portion having isocyanuric acid skeleton and at least one group selected from the silicone groups and the fluorine-containing groups on its surface can be obtained through the step in which the surface-treating liquid prepared by mixing at least the component (A) the chlorinated isocyanuric acid, (B) the organic compound mentioned above and (C), and the solvent capable of dissolving or dispersing the components (A) and (B) is brought into contact with the surface of the rubber elastic portion formed of the rubber material including a carbon-carbon double bond and exhibiting the electric conductivity.

EXAMPLE

A conductive roll of Example will be specifically explained by means of drawings.

Figure 2:
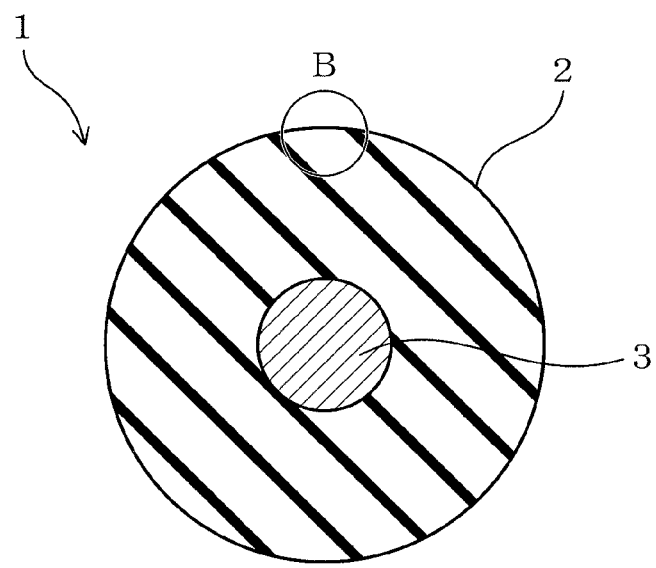
FIG. 2 is an explanatory view schematically showing an A-A cross-section of FIG. 1.

The schematic formation of the conductive roll of Example will be explained using FIG. 1 and FIG. 2. As shown in FIG. 1 and FIG. 2, a conductive roll 1 has a rubber elastic portion 2 formed of a rubber material including a carbon-carbon double bond and exhibiting electric conductivity. In this Example, the rubber elastic portion 2 is layered along a circumference of a cored bar 3. The surface of the rubber elastic portion 2 is exposed as the roll surface, and a resin layer is not formed. An organic group including one or more groups selected from silicone groups and fluorine-containing groups is bonded through an isocyanuric acid skeleton to the surface of the rubber elastic portion 2.

Figure 3A:
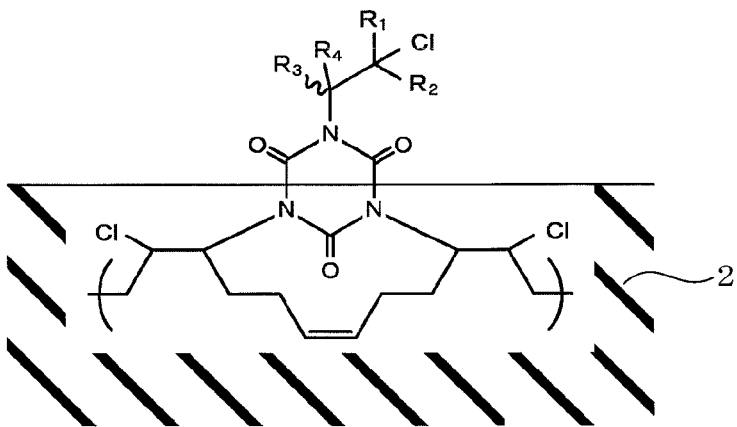
FIGS. 3(a) to 3(c) are explanatory views, each schematically showing one example of a surface of a rubber elastic portion at a position B in FIG. 2.
Figure 3B:
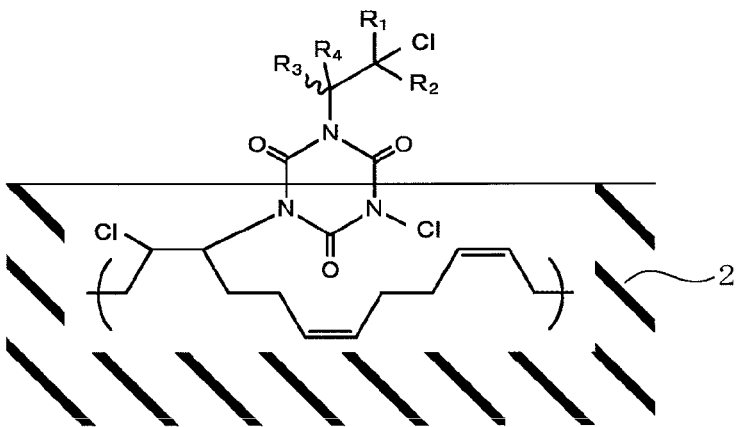
Figure 3C:
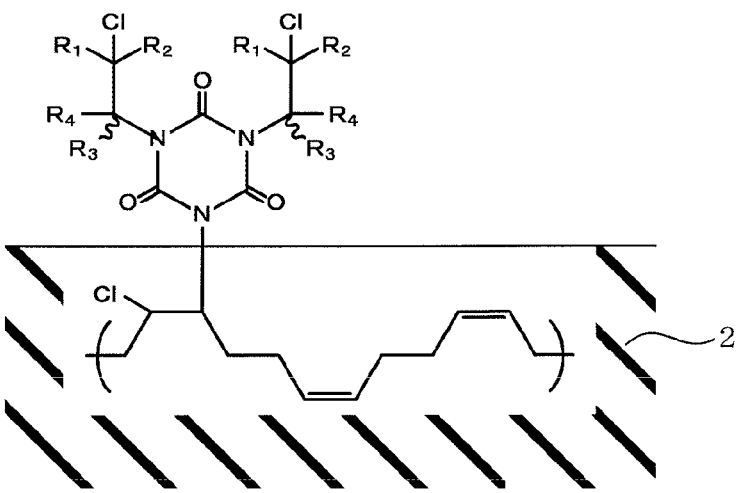

FIG. 3 schematically shows one example of a surface of a rubber elastic portion in a conductive roll of Example. FIG. 3(a) shows a formation in which an isocyanuric acid skeleton is bonded through two N-atoms to the surface of the rubber elastic portion 2, and one organic group is bonded to one isocyanuric acid skeleton. FIG. 3(b) shows a formation in which an isocyanuric acid skeleton is bonded through one N-atom to the surface of the rubber elastic portion 2, and one organic group is bonded to one isocyanuric acid skeleton. FIG. 3(c) shows a formation in which an isocyanuric acid skeleton is bonded through one N-atom to the surface of the rubber elastic portion 2, and two organic groups are bonded to one isocyanuric acid skeleton. A chlorine atom is also bonded to the surface of the rubber elastic portion 2.

Then, samples of conductive rolls were produced under different conditions, and evaluations were performed. Experimental Example will be explained below. The samples of the conductive rolls produced were charging rolls to be integrated into a printer, which is an electrophotographic image forming apparatus.

Experimental Example

<Preparation of Material for Forming Rubber Elastic Portion>

The following materials were prepared as a material for forming a rubber elastic portion.

Rubber Component
  isoprene rubber (OR) ["Nipol IR2200" manufactured by Zeon Corporation]
  butadiene rubber (BR) ["Nipol BR1220" manufactured by Zeon Corporation]

Conducting Agent
  carbon black (electron conducting agent) ["Show Black N 762" manufactured by Cabot Corporation]

Zinc Oxide ["zinc oxide grade 2" manufactured by Sakai Chemical Industry Co., Ltd.]

Stearic Acid ["stearic acid Sakura" manufactured by NOF Corporation]

Sulfur ["sulfur powder" manufactured by Tsurumi Kagaku Kogyo Kabushiki Kaisha]

Vulcanization Accelerator
  thiazole vulcanization accelerator ["Nocceler DM" manufactured by Ouchi Shinko Chemical Industrial Co., Ltd.]
  thiram vulcanization accelerator ["Nocceler TRA" manufactured by Ouchi Shinko Chemical Industrial Co., Ltd.]

Inorganic Filler Particles
  synthesized calcium carbonate ["Hakuenka CCR" having an average particle size of 0.1 μm manufactured by Shiraishi Calcium Kabushiki Kaisha, Ltd.]
  heavy calcium carbonate ["Whiton B" having an average particle size of 3.6 μm manufactured by Shiraishi Calcium Kabushiki Kaisha, Ltd.]
  silica ["NipsilLP" having an average particle size of 9 μm manufactured by Tosoh Silica Corporation]

The materials prepared were weighed in a blending ratio (part by mass) shown in Table 1. The materials weighed were kneaded for 10 minutes in a hermetically sealed mixer in which the temperature was adjusted to 50° C., to prepare materials (1) to (7) for forming a rubber elastic portion.

TABLE 1

Composition of Material for forming rubber elastic portion

| | (1) | (2) | (3) | (4) | (5) | (6) | (7) |
|---|---|---|---|---|---|---|---|
| Rubber component | | | | | | | |
| Isoprene rubber (IR) | 100 | 100 | 100 | — | 100 | 100 | 100 |
| Butadiene rubber (BR) | — | — | — | 100 | — | — | — |
| Conducting agent | | | | | | | |
| Carbon black | 30 | 30 | 30 | 30 | 30 | 30 | 30 |
| Zinc oxide | 6 | 6 | 6 | 6 | 6 | 6 | 6 |
| Stearic acid | 2 | 2 | 2 | 2 | 2 | 2 | 2 |
| Sulfur | 1 | 1 | 1 | 1 | 1 | 1 | 1 |
| Vulcanization accelerator | | | | | | | |
| Thiazole system | 0.5 | 0.5 | 0.5 | 0.5 | 0.5 | 0.5 | 0.5 |
| Thiram system | 0.5 | 0.5 | 0.5 | 0.5 | 0.5 | 0.5 | 0.5 |
| Inorganic filler particles | | | | | | | |
| Synthesized calcium carbonate | — | — | — | — | — | 50 | — |
| Heavy calcium carbonate | 50 | 30 | — | 50 | — | — | — |
| Silica | — | — | 50 | — | 70 | — | — |

<Preparation of Surface Treating Liquid>

The following materials were prepared as a material for preparing surface treating liquid.

trichloroisocyanuric acid [manufactured by Tokyo Chemical Industry Co., Ltd.]
 C=C bond-containing silicone oil ["X-22-174DX" manufactured by Shin-Etsu Chemical Co., Ltd.] (which is an organic compound represented by Formula 2 described above, and has a weight-average molecular weight of about 4,000)
 perfluorohexyl ethylene (including a C=C bond)
 tert-butyl alcohol (solvent)
 ethyl acetate (solvent)

The materials prepared were weighed in a blending ratio (part by mass) shown in Table 2. The materials weighed were mixed in a mixer to prepare surface-treating liquid (1) to (3). The C=C bond-containing silicone oil was used alone as surface-treating liquid (4).

TABLE 2

Composition of surface treating liquid

| | (1) | (2) | (3) | (4) |
|---|---|---|---|---|
| Trichloroisocyanuric acid | 5 | 5 | 5 | C=C bond-containing silicone oil only |
| C=C bond-containing silicone oil | 1 | — | — | |
| Perfluorohexyl ethylene | — | 1 | — | |
| Tert-butyl alcohol | 80 | 80 | 80 | |
| Ethyl acetate | 20 | 20 | 20 | |

<Preparation of Material for Forming Resin Layer>

A fluorine-modified acrylate resin ["Defensa TR 230 K" manufactured by DIC Corporation] 100 parts by mass, carbon black ["Ketjen Black EC 300 J" manufactured by Ketjen Black International Company] 8 parts by mass, and methyl ethyl ketone 100 parts by mass were mixed to prepare a resin layer forming material (1). A resin layer forming material (2) was prepared in the same manner as in the preparation of the resin layer-forming material (1) except that acrylic resin particles ["GM 1001" having an average particle size of 10 µm manufactured by Ganz Chemical Co., Ltd.] were further added as particles for providing roughness.

<Production of Charging Roll Sample>

The material for forming the rubber elastic portion prepared was extruded onto an outer circumferential surface of a cored bar made of a free-cutting steel (SUM) having a diameter of 6 mm in a crown shape using an extrusion equipment. Specifically, a precursor of the rubber elastic portion was extrusion-molded onto the circumference of the cored bar by supplying the predetermined material for forming the rubber elastic portion shown in Table 3 to a space between a die and the cored bar while the cored bar was made to pass through a circular opening of the die in the extrusion equipment. During this extrusion, a passing speed of the cored bar was changed to control an amount of the material adhering to the bar in a longitudinal direction of the cored bar to form the rubber elastic portion, thus obtaining the precursor of the rubber elastic portion formed of a crown. After that, the obtained bar was heat-treated at 180° C. for 30 minutes. Thus, the roll having a predetermined rubber elastic portion (a thickness of 2 mm) formed on the circumference of the cored bar was produced.

Next, the obtained roll was immersed in a predetermined surface treating liquid whose temperature was adjusted to 25° C. for 30 seconds. Subsequently, the roll separated from the surface treating liquid was washed with ethyl acetate whose temperature was adjusted to 25° C. for 30 seconds. After that, the roll washed was dried at 100° C. for 10 minutes. Thus, charging roll samples 1 to 10 were produced.

Separately, charging roll samples 11 and 12 having a resin layer (a thickness of 15 µm) formed on the surface of the rubber elastic portion were produced by coating the material (1) or (2) for forming a resin layer by a roll coating method without the surface treatment with the surface treating liquid to the surface of the rubber elastic portion, and then drying it at 130° C. for 30 minutes in the production of the charging roll samples 1 to 10.

In addition, a roll having the rubber elastic portion which was not surface-treated with the surface-treating liquid in the production of the charging roll samples 1 to 10 was used as a charging roll sample 13.

<Measurement of Surface Roughness of Roll Surface>

For the charging roll samples 1 to 10 and 13, a surface roughness Rz of the surface of the rubber elastic portion, which was the roll surface, was measured in accordance with JIS B 0601: 1994. For the charging roll samples 11 and 12, a surface roughness Rz of the surface of the resin layer, which was the roll surface, was measured. The surface roughness Rz was an average value of values measured at a total of nine points: three points evenly spaced in a circumferential direction of the conductive roll per each of three points of a center part and both ends in an axial direction of the conductive roll.

<Initial Coefficient of Friction of Roll Surface>

An initial coefficient of friction of the roll surface (the surface of the rubber elastic portion for samples 1 to 10 and 13, and the surface of the resin layer for samples 11 and 12) of the charging roll produced as a sample was measured using a tribometer ["Triboster TS 501" manufactured by Kyowa Interface Science Co., Ltd.] under conditions of a shape of a contactor: a steel ball with a diameter of 3 mm, a load: 100 g, a passing speed: 1 cm/second, a frequency: three times. Separately, the charging roll sample was set in a cartridge in a printer for evaluation ["LaserJet 3800" manufactured by Hewlett-Packard Japan, Ltd.], and 10,000 25% half tone images were output under an environment of 32.5° C.×85% RH. After that, the charging roll sample was taken out therefrom, and coefficient of friction after endurance of the roll surface (the surface of the rubber elastic portion for samples 1 to 10 and 13, and the surface of the resin layer for samples 11 and 12) was measured in the same manner as above.

<Resistance to Permanent Set>

The charging roll sample was set in a cartridge in a printer for evaluation ["LaserJet 3800" manufactured by Hewlett-Packard Japan, Ltd.], which was allowed to stand under an environment of 40° C.×95% RH for 10 days. After that, a 25% half tone image was output under an environment of 15° C.×10% RH. When image stripes, which were caused by streaky permanent set (set marks) formed on the charging roll in the axial direction at a circumference pitch of the charging roll, were not observed on the obtained image, it was evaluated as "O," which means that the permanent set resistance was high; whereas, when the image stripes were observed on the obtained image, it was evaluated as "X," which means that the permanent set resistance was low.

<Resistance to Toner Adhesion>

After the charging roll sample was set in a cartridge in a printer for evaluation ["LaserJet 3800" manufactured by Hewlett-Packard Japan, Ltd.], a 25% half tone image was output under an environment of 32.5° C.×85% RH, and then 10,000 25% half tone images were further output.

When the image stripes were not observed in a circumferential direction on an initial image obtained immediately after the charging roll sample was set, it was evaluated as "O," which means that there were not strains caused by the toner adhesion on the surface of the charging roll, and the initial resistance to toner adhesion was high. When the image stripes were observed in a circumferential direction on the obtained initial image, it was evaluated as "X," which means that there were stains caused by the toner adhesion on the surface of the charging roll, and the initial resistance to toner adhesion was low. In addition, when the image stripes were not observed in the circumferential direction on the image obtained after the endurance procedure, i.e., immediately after 10,000 images were output, it was evaluated as "O," which means that there were no stains caused by the toner adhesion on the surface of the charging roll, and the resistance to toner adhesion after endurance was high. When the image stripes were observed in the circumferential direction on the image obtained after the endurance procedure, it was evaluated as "X," which means that there were stains caused by the toner adhesion on the surface of the charging roll, and the resistance to toner adhesion after endurance was low. Here, the image stripe refers to a streaky uneven stain appearing on the printed image, which stain was caused by rotating the charging roll together with the photosensitive drum.

<Electrification Property>

The charging roll sample was set in a cartridge in a printer ["LaserJet 3800" manufactured by Hewlett-Packard Japan, Ltd.], and a 25% half tone image was output under an environment of 15° C.×10% RH. A degree of stripes (transverse stripes), which were formed in an axial direction of the roll caused by charging failure was examined from the image output.

Specifically, when the image stripes were not observed in an axial direction of the charging roll on the image obtained, it was evaluated as "A," which means that the electrification property is high. When the image stripes were observed in the axial direction of the charging roll on the image obtained, but that condition was within an acceptable range, it was evaluated as "B," which means that the electrification property was acceptable. When the image stripes were notably observed in the axial direction of the charging roll on the image obtained, it was evaluated as "C," which means that the electrification property is low.

<Uneven Image Density>

The charging roll sample was set in a cartridge in a printer ["LaserJet 3800" manufactured by Hewlett-Packard Japan, Ltd.], and a 25% half tone image was output under an environment of 15° C.×10% RH.

When an uneven image density was not observed on the image obtained, it was evaluated as "A." When the uneven image density was observed on the image obtained, but that condition was within an acceptable range, it was evaluated as "B." When the uneven image density was notably observed in the image obtained, it was evaluated as "C." It should be noted that when the surface roughness of the roll surface is too much large in the charging roll integrated into an image forming apparatus, the charging roll cannot evenly contact with a photosensitive drum, and thus the electrification property becomes uneven, whereby the uneven image density easily occurs. For that reason, here, the uneven image density was examined as reference data.

Table 3 collectively shows the detailed properties and evaluation results of the charging rolls produced as samples.

TABLE 3

| | Samples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Rubber elastic portion | | | | | | | | | | | | | |
| Composition of Material for forming rubber elastic portion | (1) | (2) | (3) | (4) | (5) | (6) | (7) | (1) | (1) | (1) | (1) | (1) | (1) |
| Composition of surface treating liquid | (1) | (1) | (1) | (1) | (1) | (1) | (1) | (2) | (3) | (4) | — | — | — |
| Existence or nonexistence of inorganic filler particles | Yes | Yes | Yes | Yes | Yes | Yes | No | Yes | Yes | Yes | Yes | Yes | Yes |
| Surface roughness Rz[μm] | 13.4 | 9.8 | 25.5 | 14.5 | 28.8 | 6.9 | 4.1 | 14.0 | 13.7 | 13.0 | — | — | 15.4 |
| Initial coefficient of friction of surface | 0.2 | 0.2 | 0.2 | 0.2 | 0.2 | 0.2 | 0.2 | 0.2 | 0.7 | 0.2 | — | — | 2.2 |
| Coefficient of friction of surface after endurance | 0.2 | 0.2 | 0.2 | 0.2 | 0.2 | 0.2 | 0.2 | 0.2 | 1.2 | 1.2 | — | — | 2.4 |
| Surface layer | No | No | No | No | No | No | No | No | No | No | | | No |
| Composition of material for forming surface layer | | | | | | | | | | | (1) | (2) | |
| Surface roughness Rz[μm] | | | | | | | | | | | 5.0 | 10.1 | |
| Initial coefficient of friction of roll surface | | | | | | | | | | | 0.2 | 0.2 | |
| Coefficient of friction of roll surface after endurance | | | | | | | | | | | 0.4 | 0.5 | |
| Resistance to Permanent Set | ○ | ○ | ○ | ○ | ○ | ○ | ○ | ○ | ○ | ○ | X | X | ○ |

TABLE 3-continued

|  | Samples | | | | | | | | | | | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 |
| Resistance to Toner Adhesion | | | | | | | | | | | | | |
| Initial stage | ○ | ○ | ○ | ○ | ○ | ○ | ○ | ○ | X | ○ | ○ | ○ | X |
| After endurance | ○ | ○ | ○ | ○ | ○ | ○ | ○ | ○ | X | X | ○ | ○ | X |
| Electrification Property | A | A | A | A | A | B | B | A | A | A | B | A | A |
| Uneven Image Density | A | A | A | A | B | A | A | A | A | A | A | A | A |

The followings can be understood from Table 3. In the charging rolls of sample 11 and sample 12, the resin layer formed of the non-crosslinked resin material is formed on the surface of the rubber elastic portion. In such a structure, because the resin layer is apt to collapse, the roll is inferior in permanent set resistance as a whole.

The charging roll of sample 13 has no problems in the permanent set resistance, because there is no resin layer on the surface of the rubber elastic portion. The surface of the rubber elastic portion, however, is not surface-treated with the specific surface-treating liquid, and thus there is no silicone group, fluorine-containing group or isocyanuric acid skeleton on the surface of the rubber elastic portion. As a result, high resistance to toner adhesion cannot be exhibited.

The charging roll of sample 9 is the roll whose rubber elastic portion surface is surface-treated with the surface-treating agent (3) including the organic compound having trichloroisocyanuric acid alone but no organic compound having silicone group or fluorine-containing group. Thus, there is no silicone group or fluorine-containing group on the surface of the rubber elastic portion. As a result, the excellent resistance to toner adhesion cannot be exhibited.

The charging roll of sample 10 is the roll whose rubber elastic portion surface is surface-treated with the surface-treating agent (4) including the organic compound having the silicone group alone but no trichloroisocyanuric acid. Thus, there is no isocyanuric acid on the surface of the on the rubber elastic portion. As a result, the excellent resistance to toner adhesion cannot be exhibited.

Here, when the surfaces of the rubber elastic portions of the charging rolls of sample 1 to sample 8 were analyzed by XPS, the presence of silicon (Si), fluorine (F), chlorine (Cl) or nitrogen (N) was observed on the surfaces of the rubber elastic portions. In addition, the NMR analysis confirmed the presence of the silicone group, perfluorohexyl group or isocyanuric acid skeleton on the surfaces of the rubber elastic portions. Furthermore, it can be said that the organic group including the silicone group or perfluorohexyl group is bonded through the isocyanuric acid skeleton to the surface of the rubber elastic portion, considering that the surface of the rubber elastic portion was surface-treated with the surface-treating liquid described above, and the resistance to toner adhesion is exhibited in the endurance tests described above.

It could be confirmed that the charging rolls of sample 1 to sample 8 had the high resistance to permanent set as well as the highly excellent resistance to adhesion, i.e., it is difficult to cause the adhesion of the toner to the surface of the rubber elastic portion. In addition, it can also be said that the charging rolls of sample 1 to sample 8 had an electrification property necessary for a charging roll to be used in an image forming apparatus, and failures such as uneven image density hardly occur.

The followings can be further understood from the comparison of the charging rolls of sample 1 to sample 8. All charging rolls of sample 1 to sample 4 and sample 8 include the inorganic filler in the rubber elastic portions, and the surface irregularity is formed. The surface roughness Rz of the rubber elastic portion is within a range of 7 to 28 μm. Accordingly, in the aforesaid charging rolls, the surface area of the rubber elastic portion increases due to the surface irregularity corresponding to the surface roughness. Consequently, when the surface of the rubber elastic portion is made contact with a photoreceptor to charge the photoreceptor, minute spaces are easily secured on the contact area. It can be understood, therefore, that a discharge region is expanded during the contact so that uniform charge of the photoreceptor can be easily attained.

Examples of the present invention have been explained in detail above, but the invention is not limited to Examples described above, and various modifications can be made within a range in which the sprit and scope of the present invention is not impaired.

REFERENCE NUMERALS

1: conductive roll
2: rubber elastic portion
3: shaft

What is claimed is:

1. A conductive roll comprising:
an axis body with conductivity; and
a rubber elastic portion layered along a circumference of the axis body;
the rubber elastic portion being formed of a rubber material including carbon-carbon double bonds and exhibiting electric conductivity, a surface of the rubber elastic portion being exposed as a surface of the roll,
wherein an organic group including one or more groups selected from silicone groups and fluorine-containing groups is bonded through an isocyanuric acid skeleton to the surface of the rubber elastic portion,
wherein the isocyanuric acid skeleton is bonded to the rubber material including carbon-carbon double bonds by a N—C bond and the organic group is bonded to the isocyanuric acid skeleton by a C—N bond, and
wherein the surface of the rubber elastic portion has at least one chemical structure represented by a chemical formulae selected from the group consisting of (a), (b) and (c):

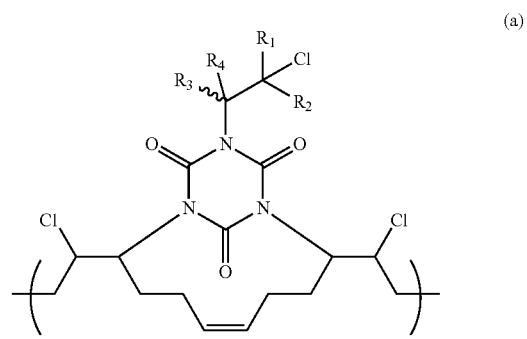

-continued (b)
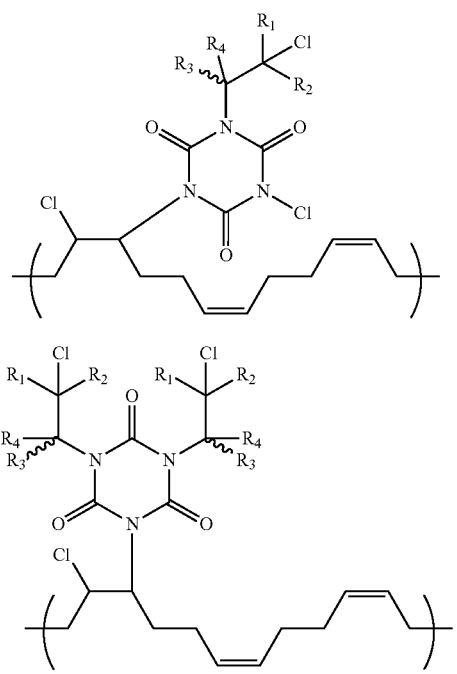

(c)

wherein
R$_1$: —X$_2$—X$_1$ or —X$_1$;
X$_1$: a silicone group or a fluorine-containing group;
X$_2$: a group selected from an ester group, an ether group, an allyl group, a urethane group and an amido group; and
R$_2$ to R$_4$: a group selected from a hydrogen atom, an alkyl group and R$_1$.

2. The conductive roll according to claim 1, wherein the organic group is a group derived from an organic compound including one or more groups selected from silicone groups and fluorine-containing groups and having carbon-carbon double bonds.

3. The conductive roll according to claim 2, wherein the organic compound including carbon-carbon double bonds comprises an organic compound that is represented by a chemical formula:

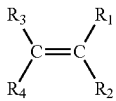

wherein
R$_1$: —X$_2$—X$_1$ or —X$_1$;
X$_1$: a silicone group or a fluorine-containing group;
X$_2$: a group selected from an ester group, an ether group, an allyl group, a urethane group and an amido group; and
R$_2$ to R$_4$: a group selected from a hydrogen atom, an alkyl group and R$_1$.

4. The conductive roll according to claim 3, wherein the rubber elastic portion has a surface roughness Rz within a range of 7 to 28 μm.

5. The conductive roll according to claim 4, wherein the rubber elastic portion includes an inorganic filler, and the inorganic filler provides roughness to the surface of the rubber elastic portion.

6. The conductive roll according to claim 5, wherein the rubber elastic portion further comprises carbon black, and wherein the inorganic filler is at least one of calcium carbonate and silica.

7. The conductive roll according to claim 6, which is used as a charging roll or a developing roll in an electrophotographic image forming apparatus.

8. The conductive roll according to claim 2, wherein the organic compound including carbon-carbon double bonds consists essentially of an organic compound that is represented by a chemical formula:

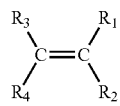

wherein
R$_1$: —X$_2$—X$_1$ or —X$_1$;
X$_1$: a silicone group or a fluorine-containing group;
X$_2$: a group selected from an ester group, an ether group, an allyl group, a urethane group and an amido group; and
R$_2$ to R$_4$: a group selected from a hydrogen atom, an alkyl group and R$_1$.

9. The conductive roll according to claim 1, wherein the rubber material including carbon-carbon double bonds is at least one kind selected from the group consisting of isoprene rubber, butadiene rubber, acrylonitrile-butadiene rubber, styrene-butadiene rubber, chloroprene rubber, butyl rubber, ethylene-propylene-diene rubber, natural rubber.

10. The conductive roll according to claim 9, wherein the organic group is a group derived from an organic compound including one or more groups selected from silicone groups and fluorine-containing groups and having carbon-carbon double bonds.

11. The conductive roll according to claim 10, wherein the organic compound including carbon-carbon double bonds comprises an organic compound that is represented by a chemical formula:

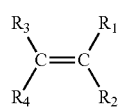

wherein
R$_1$: —X$_2$—X$_1$ or —X$_1$;
X$_1$: a silicone group or a fluorine-containing group;
X$_2$: a group selected from an ester group, an ether group, an allyl group, a urethane group and an amido group; and
R$_2$ to R$_4$: a group selected from a hydrogen atom, an alkyl group and R$_1$.

12. The conductive roll according to claim 10, wherein the organic compound including carbon-carbon double bonds consists essentially of an organic compound that is represented by a chemical formula:

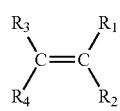

wherein
R$_1$: —X$_2$—X$_1$ or —X$_1$;
X$_1$: a silicone group or a fluorine-containing group;

$X_2$: a group selected from an ester group, an ether group, an allyl group, a urethane group and an amido group; and $R_2$ to $R_4$: a group selected from a hydrogen atom, an alkyl group and $R_1$.

13. The conductive roll according to claim 1, wherein the rubber material including carbon-carbon double bonds is acrylonitrile-butadiene rubber.

14. The conductive roll according to claim 13, wherein the organic group is a group derived from an organic compound including one or more groups selected from silicone groups and fluorine-containing groups and having carbon-carbon double bonds.

15. The conductive roll according to claim 1, wherein the rubber elastic portion includes an inorganic filler, and the inorganic filler provides roughness to the surface of the rubber elastic portion.

16. The conductive roll according to claim 15, wherein the rubber elastic portion further comprises carbon black, and
wherein the inorganic filler is at least one of calcium carbonate and silica.

17. The conductive roll according to claim 1, wherein
the rubber elastic portion has a surface roughness Rz within a range of 7 to 28 μm.
wherein the inorganic filler is at least one of calcium carbonate and silica.

18. The conductive roll according to claim 1, which is used as a charging roll or a developing roll in an electrophotographic image forming apparatus.

* * * * *